(12) United States Patent
Cho

(10) Patent No.: US 11,907,702 B2
(45) Date of Patent: Feb. 20, 2024

(54) DEVICE FOR MANAGING UPDATE OF VEHICLE, METHOD FOR OPERATING THE SAME, AND VEHICLE

(71) Applicants: HYUNDAI MOTOR COMPANY, Seoul (KR); Kia Corporation, Seoul (KR)

(72) Inventor: Yong Woon Cho, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 231 days.

(21) Appl. No.: 17/497,232

(22) Filed: Oct. 8, 2021

(65) Prior Publication Data

US 2022/0391191 A1 Dec. 8, 2022

(30) Foreign Application Priority Data

Jun. 7, 2021 (KR) ........................ 10-2021-0073543

(51) Int. Cl.
| | |
|---|---|
| G06F 9/44 | (2018.01) |
| G06F 8/65 | (2018.01) |
| H04W 28/02 | (2009.01) |
| H04W 4/40 | (2018.01) |
| H04W 88/18 | (2009.01) |
| H04W 88/04 | (2009.01) |
| H04W 8/24 | (2009.01) |

(52) U.S. Cl.
CPC ................ *G06F 8/65* (2013.01); *H04W 4/40* (2018.02); *H04W 8/245* (2013.01); *H04W 28/0252* (2013.01); *H04W 28/0273* (2013.01); *H04W 88/04* (2013.01); *H04W 88/182* (2013.01)

(58) Field of Classification Search
CPC .......... G06F 8/65; H04W 4/40; H04W 8/245; H04W 88/04; H04W 88/182; H03W 28/0252; H03W 28/0273
USPC ......................................................... 717/172
See application file for complete search history.

(56) References Cited

U.S. PATENT DOCUMENTS

| | | | |
|---|---|---|---|
| 9,142,071 B2* | 9/2015 | Ricci .................... | H04L 63/0236 |
| 2011/0039527 A1* | 2/2011 | Yi ......................... | H04W 48/18 |
| | | | 455/418 |
| 2016/0133062 A1* | 5/2016 | Greenberg ............ | G06F 40/106 |
| | | | 701/29.4 |
| 2017/0024201 A1* | 1/2017 | Diedrich ................ | G06F 8/65 |
| 2021/0051000 A1* | 2/2021 | Yang ..................... | H04L 9/08 |
| 2022/0198840 A1* | 6/2022 | Gintz .................... | G06F 8/71 |
| 2023/0158975 A1* | 5/2023 | Fang ..................... | B60R 16/023 |
| | | | 701/36 |

OTHER PUBLICATIONS

Title: A vehicle electric control unit over-the-air reprogramming system, author: G Shi et al, published on 2015.*

(Continued)

*Primary Examiner* — Qamrun Nahar
(74) *Attorney, Agent, or Firm* — MORGAN, LEWIS & BOCKIUS LLP

(57) ABSTRACT

A device for managing update of a vehicle includes a communication device in communication with at least one control device of the vehicle and in communication with an OTA (Over The Air) server for software update of the at least one control device, and a controller that relays communication between the at least one control device and the OTA server, and controls the at least one control device.

17 Claims, 8 Drawing Sheets

(56) References Cited

OTHER PUBLICATIONS

Title: A model-based security testing approach for automotive over-the-air updates, author: S Mahmood et al, published on 2020.*

* cited by examiner

DEVICE FOR MANAGING UPDATE OF VEHICLE, METHOD FOR OPERATING THE SAME, AND VEHICLE

CROSS-REFERENCE TO RELATED APPLICATION

This application claims the benefit of priority to Korean Patent Application No. 10-2021-0073543, filed in the Korean Intellectual Property Office on Jun. 7, 2021, the entire contents of which are incorporated herein by reference.

TECHNICAL FIELD

The present disclosure relates to a device for managing update of a vehicle, a method for operating the same, and the vehicle.

BACKGROUND

Driven by a rapid development of vehicle-related technologies, vehicles that are recently released are equipped with control devices for controlling various electric functions such as an ABS, an EPS, an ADAS, and the like. For maintenance and management of each of the control devices, an ability to continuously manage installed software is very important. Thus, a software update technology through over the air (OTA) is being developed to rapidly and continuously respond to bugs, defects, and changing laws and regulations.

Because software of control devices for performing autonomous driving functions requires frequent function improvement based on a travel environment, customized R&H (Ride & Handling) calibration, and the like, an update frequency of the software of such control devices is higher than that of other control devices. Therefore, there is a need for a technology for efficient update of the control devices that perform the autonomous driving functions.

The information disclosed in the Background section above is to aid in the understanding of the background of the present disclosure, and should not be taken as acknowledgement that this information forms any part of prior art

SUMMARY

The present disclosure has been made to solve the above-mentioned problems occurring in the prior art while advantages achieved by the prior art are maintained intact.

An aspect of the present disclosure provides a device for managing update of a vehicle that manages OTA update of software installed in a control device in an integrated manner.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for managing update of a vehicle includes a communication device in communication with at least one control device of the vehicle and in communication with an OTA (Over The Air) server for software update of the at least one control device, and a controller that relays communication between the at least one control device and the OTA server, and controls the at least one control device.

In one aspect, the controller may receive a communication request from at least one application of the at least one control device, and establish communication with the at least one application in response to the communication request.

In one aspect, the controller may select a network provider for establishing the communication with the OTA server based on a region where the vehicle is located.

In one aspect, the controller may set a communication policy based on the region where the vehicle is located, and establish the communication with the OTA server through the network provider based on the communication policy.

In one aspect, the controller may obtain user information and version information from at least one application of the at least one control device and authenticate the user information and the version information, and transmit the authenticated user information and the authenticated version information to the OTA server.

In one aspect, the controller may perform relay such that at least one application of the at least one control device directly receives information on the software update from the OTA server when relaying the communication between the at least one control device and the OTA server.

In one aspect, the controller may block access to the vehicle from outside when relaying the communication between the at least one control device and the OTA server.

In one aspect, the controller may identify a usage amount of wireless data or a speed of the wireless data, and perform bandwidth throttling and flow control based on the usage amount of the wireless data or the speed of the wireless data when relaying the communication between the at least one control device and the OTA server.

In one aspect, the controller may include a proxy server.

According to another aspect of the present disclosure, a method for operating a device for managing update of a vehicle includes establishing communication with at least one control device of the vehicle, establishing communication with an OTA server for software update of the at least one control device, and relaying communication between the at least one control device and the OTA server.

In one aspect, the establishing communication with at least one control device of the vehicle may include receiving a communication request from at least one application of the at least one control device, and establishing communication with the at least one application in response to the communication request.

In one aspect, the establishing communication with an OTA server for software update of the at least one control device may include selecting a network provider for establishing the communication with the OTA server based on a region where the vehicle is located.

In one aspect, the establishing communication with an OTA server for software update of the at least one control device may include setting a communication policy based on the region where the vehicle is located, and establishing the communication with the OTA server through the network provider based on the communication policy.

In one aspect, the method may further include obtaining user information and version information from at least one application of the at least one control device, authenticating the user information and the version information, and transmitting the authenticated user information and the authenticated version information to the OTA server.

In one aspect, the relaying communication between the at least one control device and the OTA server may include performing relay such that at least one application of the at least one control device directly receives information on the software update from the OTA server.

In one aspect, the relaying communication between the at least one control device and the OTA server may include blocking access to the vehicle from outside when relaying the communication between the at least one control device and the OTA server.

In one aspect, the relaying communication between the at least one control device and the OTA server may include identifying a usage amount of wireless data or a speed of the wireless data, and performing bandwidth throttling and flow control based on the usage amount of the wireless data or the speed of the wireless data when relaying the communication between the at least one control device and the OTA server.

According to another aspect of the present disclosure, a vehicle includes at least one control device of the vehicle, and an integrated control device that communicates with the at least one control device of the vehicle, communicates with an OTA server for software update of the at least one control device, relays communication between the at least one control device and the OTA server, and controls the at least one control device.

In one aspect, the integrated control device may authenticate user information and version information obtained from the at least one control device, transmit the authenticated user information and the authenticated version information to the OTA server, and perform relay such that at least one application of the at least one control device receives information on the software update directly from the OTA server when relaying the communication between the at least one control device and the OTA server.

In one aspect, the at least one control device may include at least one control device for performing an autonomous driving function of the vehicle, and the integrated control device may manage the autonomous driving function of the at least one control device for performing the autonomous driving function of the vehicle in an integrated manner, and may include a proxy server.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
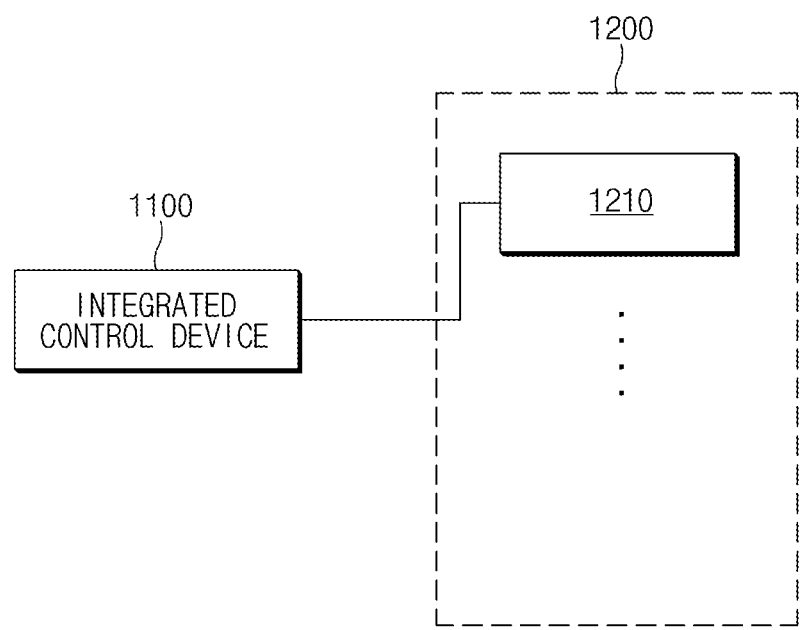
FIG. 1 is a view showing a vehicle according to an exemplary embodiment disclosed in the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a view showing a vehicle according to an exemplary embodiment disclosed in the present disclosure.

Referring to FIG. 1, a vehicle 1000 according to an exemplary embodiment disclosed in the present disclosure may include an integrated control device 1100 and at least one control device 1200.

The integrated control device 1100 may communicate with the at least one control device of the vehicle. For example, the integrated control device 1100 may perform vehicle communication (e.g., CAN communication) with the at least one control device 1200.

In one exemplary embodiment, the at least one control device 1200 may include at least one control device that performs an autonomous driving function of the vehicle.

The integrated control device 1100 may manage the autonomous driving functions of the control devices performing the autonomous driving functions included in the at least one control device 1200 in an integrated manner. Specifically, the integrated control device 1100 may include an ADAS DRV, and the at least one control device 1200 may include an ADAS PRK, an ADAS VP, an HDM, and the like.

The integrated control device 1100 may communicate with an OTA server for software update of the at least one control device 1200. For example, the integrated control device 1100 may wirelessly communicate with the OTA server and may select a network provider for the wireless communication. In this connection, the wireless communication may include at least one of Wi-Fi and/or data communication (LTE and 5G). In one example, the OTA server may be a cloud server outside the vehicle 1000.

The integrated control device 1100 may relay communication between the at least one control device 1200 and the OTA server. For example, communication between at least one application of the at least one control device 1200 and the OTA server may be relayed. Specifically, the integrated control device 1100 may authenticate user information and version information obtained from the at least one application of the at least one control device 1200, and may transmit the authenticated user and version information to the OTA server. In addition, when relaying the communication between the at least one control device 1200 and the OTA server, the integrated control device 1100 may relay the at least one application of the at least one control device 1200 to receive information on software update directly from the OTA server.

In this connection, directly receiving the information on software update means that the information on the update is not stored in the integrated control device 1100 but is directly transmitted to the at least one application.

The at least one control device 1200 may include a first control device 1210. In this connection, although the at least one control device 1200 is illustrated in FIG. 1 as including only the first control device 1210, the present disclosure is not limited thereto. That is, the at least one control device 1200 may include n (n is a natural number greater than or equal to 2) control devices.

The at least one control device 1200 may include the at least one application. For example, at least one application for performing the autonomous driving function may be installed in the at least one control device 1200.

That is, the vehicle 1000 may relay the communication between the at least one control device 1200 and the OTA server with an operation of the integrated control device 1100, and may relay direct information exchange of the at least one application of the at least one control device 1200 with the OTA server. The vehicle 1000 may implement a vehicle's own OTA management control technology with the operation of the integrated control device 1100. As another example, the vehicle 1000 may implement the own OTA management control technology for the autonomous driving function of the vehicle 1000 with the operation of the integrated control device 1100.

Hereinafter, an update management device 100 of the vehicle 1000 will be described in detail with reference to FIG. 2.

Figure 2:
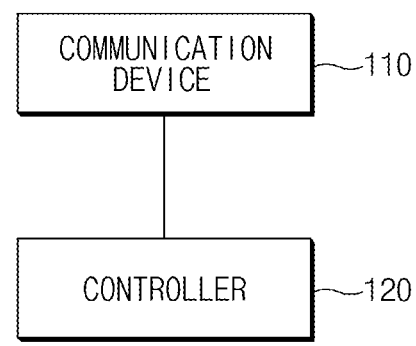
FIG. 2 is a block diagram showing an update management device of a vehicle according to an exemplary embodiment disclosed in the present disclosure.

FIG. 2 is a block diagram showing an update management device of a vehicle according to an exemplary embodiment disclosed in the present disclosure.

Referring to FIG. 2, the update management device 100 of the vehicle 1000 may include a communication device 110 and a controller 120.

In this connection, the update management device 100 of the vehicle 1000 may be substantially the same as the integrated control device 1100 in FIG. 1.

The communication device 110 may communicate with the at least one control device 1200. For example, the communication device 110 may perform wired vehicle communication (e.g., the CAN communication) with the at least one control device 1200.

The communication device 110 may communicate with the OTA (Over The Air) server for software update of the at least one control device 1200. For example, the communication device 110 may perform wireless communication with the OTA server. In this connection, the wireless communication may include the Wi-Fi and the data communication (the LTE and the 5G).

The controller 120 of the update management device 100 according to an exemplary embodiment of the present disclosure may be a processor (e.g., computer, microprocessor, CPU, ASIC, circuitry, logic circuits, etc.). The controller 120 may be implemented by a non-transitory memory storing, e.g., a program(s), software instructions reproducing algorithms, etc., which, when executed, controls operations of various components of the vehicle, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The controller 120 may receive a communication request from the at least one application of the at least one control device 1200. For example, the controller 120 may receive a TCP/IP communication request from the at least one application. In this connection, there may be the communication request at a socket end of the at least one application, and the controller 120 may receive the communication request.

The controller 120 may establish communication with the at least one application in response to the communication request.

For example, the controller 120 may establish TCP/IP communication with the at least one application.

In one example, the controller 120 may perform communication with the communication device 110 using an API (e.g., a libcurl) in the at least one application, and may perform the communication with the communication device 110 using a system environment variable when an operating system (OS) of the at least one application is a Linux.

The controller 120 may select the network provider for establishing the communication with the OTA server based on a region in which the vehicle 1000 is located. For example, the controller 120 may use an external wireless network for the wireless communication with the OTA server, and a type of the network provider for using the external wireless network varies depending on a country and a region, so that the network provider may be selected based on the region in which the vehicle 1000 is located.

The controller 120 may set a communication policy for establishing the communication with the OTA server based on the region in which the vehicle 1000 is located. For example, the controller 120 may set communication retries of x times (x is a natural number greater than or equal to 1) and a communication timeout of y seconds (y is a natural number greater than or equal to 1) as the communication policy. Specifically, because a speed of the wireless network and a degree of smoothness of wireless network communication may be different for each region in which the vehicle 1000 is located, the controller 120 may smoothly communicate the OTA server with the communication device 110 by setting the communication policy differently for each region in which the vehicle 1000 is located.

The controller 120 may perform the communication between the OTA server and the communication device 110 based on the set communication policy and the selected network provider. For example, the controller 120 may establish the TCP/IP communication between the communication device 110 and the OTA server.

The controller 120 may obtain the user information and the version information from the at least one application of the at least one control device 1200. For example, the controller 120 may obtain VIN information of the vehicle 1000 and software version information of the at least one application from the at least one application of the at least one control device 1200.

The controller 120 may authenticate the user information and the version information obtained from the at least one application. For example, the controller 120 may authenticate the VIN information of the vehicle 1000 to authenticate that the controller 120 is a control device in the vehicle 1000, and may authenticate the software version information to identify a state of the vehicle 1000.

The controller 120 may transmit the authenticated user information and version information to the OTA server. For example, the controller 120 may authenticate the user information and the version information of the at least one application in advance, and transmit only the authenticated user information and version information to the OTA server. The OTA server may determine whether update of the at least one application is needed based on the authenticated user information and version information. The controller 120 may perform the user information authentication and the version information authentication described above after performing the communication with the at least one application of the at least one control device 1200.

The controller 120 may relay the communication between the at least one control device 1200 and the OTA server. For example, when relaying the communication between the at least one control device 1200 and the OTA server, the controller 120 may relay the communication such that the at least one application of the at least one control device 1200 and the OTA server may directly exchange the information with each other. In this connection, that the at least one application and the OTA server directly exchanging the information with each other does not mean that the information is stored in the controller 120 and then transmitted to the at least one application, but may mean that the information is able to be directly transmitted from the OTA server to the at least one application.

Specifically, when it is determined that the update of the at least one application is needed, the OTA server may directly transmit information on the update to the at least one application without transmitting the information on the update of the at least one application to the controller 120 and storing the information. That is, the at least one application may directly download the information on the software update from the OTA server. In this connection, the information on the update of the at least one application may include at least one of software version information, ROM information, and/or a content of firmware.

When relaying the communication between the at least one control device 1200 and the OTA server, the controller 120 may block access to the vehicle 1000 from the outside. For example, because the communication device 110 and the OTA server perform the wireless communication, there may be an attempt to access or hack the wireless communication from the outside. The controller 120 may block the attempt to access the vehicle 1000 from the outside by performing an access control or approach control function.

When the controller 120 relays the communication between the at least one control device 1200 and the OTA server, the controller 120 may identify a usage amount of wireless data or a speed of the wireless data. For example, the controller 120 may determine whether the usage amount of the wireless data is higher than or equal to a threshold value, and may determine whether the speed of the wireless data is higher than or equal to a reference value.

When relaying the communication between the at least one control device 1200 and the OTA server, the controller 120 may perform bandwidth throttling and flow control based on the identified usage amount or speed of the wireless data. For example, when the identified usage amount of the wireless data is higher than or equal to the threshold value, the controller 120 may limit a bandwidth to reduce the usage amount of the wireless data. In addition, when the identified speed of the wireless data is higher than or equal to the reference value, the controller 120 may limit a flow of the wireless data because the information transmitted from the OTA server to the at least one application may be lost. For example, flow control may be implemented using a stop and wait scheme or a sliding window scheme.

In one example, the controller 120 may include a proxy server. Because the proxy server is a relay server, the proxy server may relay the communication between the at least one control device 1200 and the OTA server, may select the network provider, perform the access control, perform the bandwidth throttling, and perform the flow control. That is, the controller 120 may be implemented as the proxy server.

In addition, the controller 120 may control the at least one control device 1200. For example, the controller 120 may control the at least one control device 1200 performing the autonomous driving function among the at least one control device 1200. As another example, the controller 120 may perform a function of managing the autonomous driving functions of the vehicle in an integrated manner. That is, the update management device 100 of the vehicle may manage the autonomous driving function of the vehicle performed by the at least one control device 1200 that performs the autonomous driving function of the vehicle included in the at least one control device 1200 in the integrated manner without being limited to managing the update of the at least one control device 1200.

Because the update management device 100 of the vehicle establishes the communication with the at least one application of the at least one control device 1200 and establishes the communication with the OTA server, the update management device 100 may unify and manage the communication with the OTA server even when there are a plurality of applications. Therefore, the update management device 100 of the vehicle may relay the communication such that the at least one application may directly obtain the information on the update from the OTA server, and may perform the selection of the network provider, the access control, the bandwidth throttling, and the flow control. That is, the update management device 100 of the vehicle may manage the update of the at least one application of the control device 1200 of the vehicle. As another example, the update management device 100 of the vehicle may manage the update of the at least one application that performs the autonomous driving function.

Hereinafter, a method for operating the update management device 100 of the vehicle will be described in detail with reference to FIG. 3.

Figure 3:
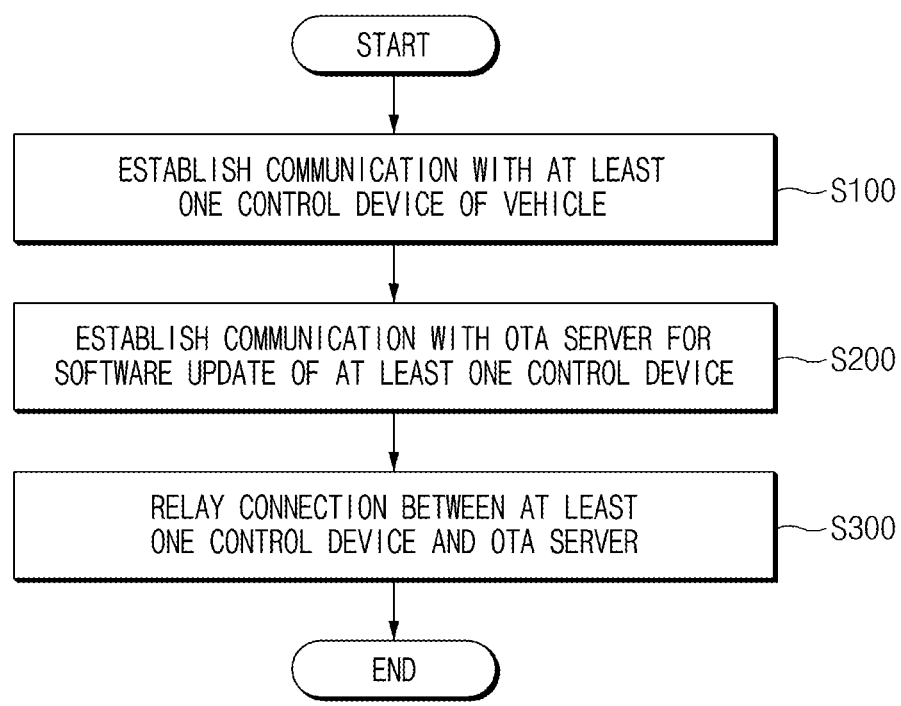
FIG. 3 is a flowchart showing a method for operating an update management device of a vehicle according to an exemplary embodiment disclosed in the present disclosure.

FIG. 3 is a flowchart showing a method for operating an update management device of a vehicle according to an exemplary embodiment disclosed in the present disclosure.

Referring to FIG. 3, the method for operating the update management device 100 of the vehicle 1000 may include establishing the communication with the at least one control device 1200 of the vehicle (S100), establishing the communication with the OTA server 2000 for the software update of the at least one control device 1200 (S200), and relaying the communication between the at least one control device 1200 and the OTA server 2000 (S300).

Hereinafter, this will be described in detail with reference to FIGS. 1 and 2.

In the establishing of the communication with the at least one control device of the vehicle (S100), the controller 120 may establish the communication between the at least one control device 1200 and the communication device 110. For example, the controller 120 may establish the TCP/IP communication between the at least one application of the at least one control device 1200 and the communication device 110.

In the establishing of the communication with the OTA server for the software update of the at least one control device (S200), the controller 120 may establish the communication between the OTA server 2000 for the software update of the at least one control device 1200 and the communication device 110. For example, the controller 120 may establish the TCP/IP communication between the communication device 110 and the OTA server 2000.

In the relaying of the communication between the at least one control device and the OTA server (S300), the controller 120 may relay the communication between the at least one control device 1200 and the OTA server 2000. For example, the controller 120 may relay the communication between the at least one application of the at least one control device 1200 and the OTA server 2000.

In the relaying of the communication between the at least one control device and the OTA server (S300), the controller 120 may relay the communication between the at least one control device 1200 and the OTA server 2000. For example, the controller 120 may relay reception of the information for the software update directly of the at least one application of the at least one control device 1200 directly from the OTA server 2000.

In the relaying of the communication between the at least one control device and the OTA server (S300), when relaying the communication between the at least one control device 1200 and the OTA server 2000, the controller 120 may block the access to the vehicle 1000 from the outside. For example, the controller 120 may block the attempt to access and hack the vehicle 1000 from the outside when performing the wireless communication between the communication device 110 and the OTA server 2000 through the performance of the access control or approach control function.

In the relaying of the communication between the at least one control device and the OTA server (S300), when relaying the communication between the at least one control device 1200 and the OTA server 2000, the controller 120 may identify the usage amount of the wireless data and the speed of the wireless data. For example, the controller 120 may determine whether the usage amount of the wireless data is higher than or equal to the threshold value and whether the speed of the wireless data is higher than or equal to the reference value.

In the relaying of the communication between the at least one control device and the OTA server (S300), when relaying the communication between the at least one control device 1200 and the OTA server 2000, the controller 120 may perform the bandwidth throttling and the flow control based on the identified usage amount and speed of the wireless data. For example, the controller 120 may adjust the usage amount of wireless data by limiting the bandwidth of the wireless communication when the usage amount of the wireless data is identified to be higher than or equal to the threshold value, and may limit the flow of the wireless data to prevent the loss of the information when the speed of the wireless data is higher than or equal to the reference value.

Hereinafter, FIGS. 4 to 6 will be referred to for describing in more detail the method for operating the update management device 100 of the vehicle.

Figure 4:
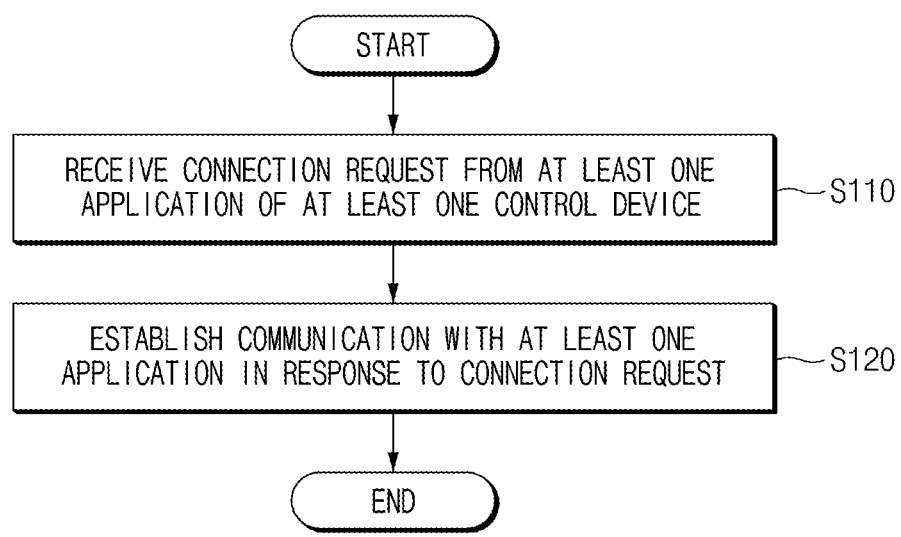
FIGS. 4, 5 and 6 are flowcharts showing in more detail a method for operating an update management device of a vehicle according to an exemplary embodiment disclosed in the present disclosure.
Figure 5:
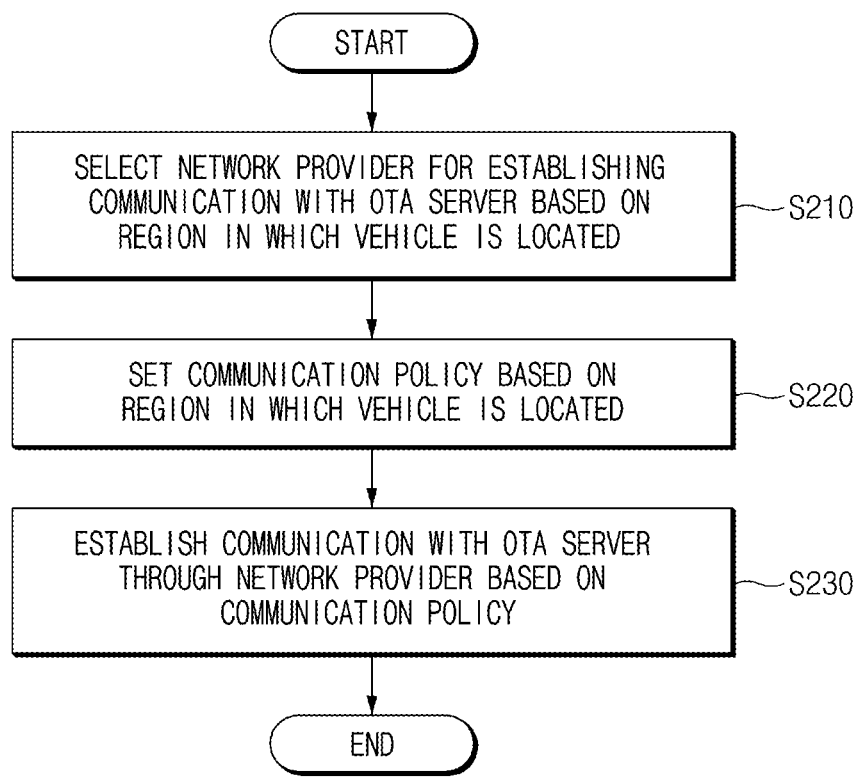
Figure 6:
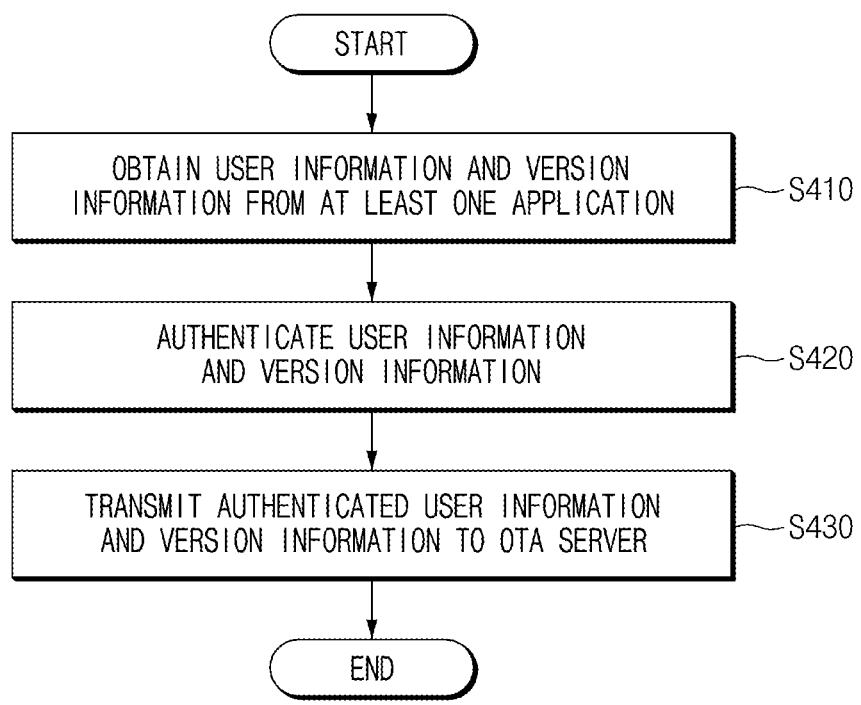

FIGS. 4, 5 and 6 are flowcharts showing in more detail a method for operating an update management device of a vehicle according to an exemplary embodiment disclosed in the present disclosure.

Referring to FIG. 4, the method for operating the update management device 100 of the vehicle may include receiving the communication request from the at least one application of the at least one control device 1200 (S110), and establishing the communication with the at least one application in response to the communication request (S120).

In the receiving of the communication request from the at least one application of the at least one control device (S110), the controller 120 may receive the communication request from the at least one application of the at least one control device 1200. For example, the controller 120 may receive the communication request transmitted from the socket end of the at least one application.

In the establishing of the communication with the at least one application in response to the communication request (S120), the controller 120 may establish the communication between the communication device 110 and the at least one application in response to the communication request from the at least one application of the at least one control device 1200.

In one example, S100 in FIG. 3 may include S110 and S120.

Referring to FIG. 5, the method for operating the update management device 100 of the vehicle 1000 may include selecting the network provider for establishing the communication with the OTA server 2000 based on the region in which the vehicle 1000 is located (S210), setting the communication policy based on the region in which the vehicle 1000 is located (S220), and establishing the communication with the OTA server 2000 through the network provider based on the communication policy (S230).

In the selecting of the network provider for establishing the communication with the OTA server based on the region in which the vehicle 1000 is located (S210), the controller 120 may select the network provider based on the region in which the vehicle 1000 is located. For example, the controller 120 may change the network provider for each region in which the vehicle 1000 is located for the communication with the OTA server 2000 through the wireless communication.

In the setting of the communication policy based on the region in which the vehicle 1000 is located (S220), the controller 120 may set the communication policy used when establishing the communication with the OTA server 2000. For example, the controller 120 may set the communication policy based on the region in which the vehicle 1000 is located, because the speed of the wireless communication and the network provider may be different for each region in which the vehicle 1000 is located.

In the establishing of the communication with the OTA server through the network provider based on the communication policy (S230), the controller 120 may establish the communication with the OTA server 2000 based on the communication policy set based on the region in which the vehicle 1000 is located and the selected network provider. For example, the controller 120 may perform the communication based on the communication policy set when establishing the communication between the communication device 110 and the OTA server 2000 through the selected network provider.

In one example, S200 in FIG. 3 may include S210 to S230.

Hereinafter, operations that may be further included in the method for operating the update management device 100 of the vehicle 1000 will be described in detail with reference to FIG. 6.

Referring to FIG. 6, the method for operating the update management device 100 of the vehicle 1000 may include obtaining the user information and the version information from the at least one application (S410), authenticating the user information and the version information (S420), and transmitting the authenticated user information and version information to the OTA server 2000 (S430).

In the obtaining of the user information and the version information from the at least one application (S410), the controller 120 may obtain the user information and the version information from the at least one application of the at least one control device 1200. For example, the controller 120 may obtain the VIN information of the vehicle 1000 and the version information of the software from the at least one application.

In the authenticating of the user information and the version information (S420), the controller 120 may authenticate the obtained user information and version information. For example, the controller 120 may authenticate that the at least one application is inside the vehicle 1000 based on the obtained user information, and authenticate a state of the at least one application through the software version information.

In the transmitting of the authenticated user information and version information to the OTA server (S430), the controller 120 may transmit the authenticated user information and version information to the OTA server 2000. For example, the OTA server 2000 may obtain the authenticated user information and version information from the controller 120 to determine whether the update of the at least one application is needed.

In one example, S410 and S420 may be performed after S100 in FIG. 3 and may be performed before or after S200. On the other hand, S430 may be performed after S200 in FIG. 3.

In conclusion, the update management device 100 of the vehicle 1000 may relay the communication between the at least one application of the at least one control device 1200 and the OTA server 2000 through the performance of the operations in the method, and may manage the update of the at least one application. That is, the update management device 100 of the vehicle 1000 may manage the update of the applications of the control device in the integrated manner. As another example, the update management device 100 of the vehicle 1000 may manage the update of the applications that perform the autonomous driving functions of the vehicle 1000 in the integrated manner.

Hereinafter, the vehicle 1000 and an OTA server 2000 disclosed in the present disclosure will be described in detail with reference to FIG. 7.

Figure 7:
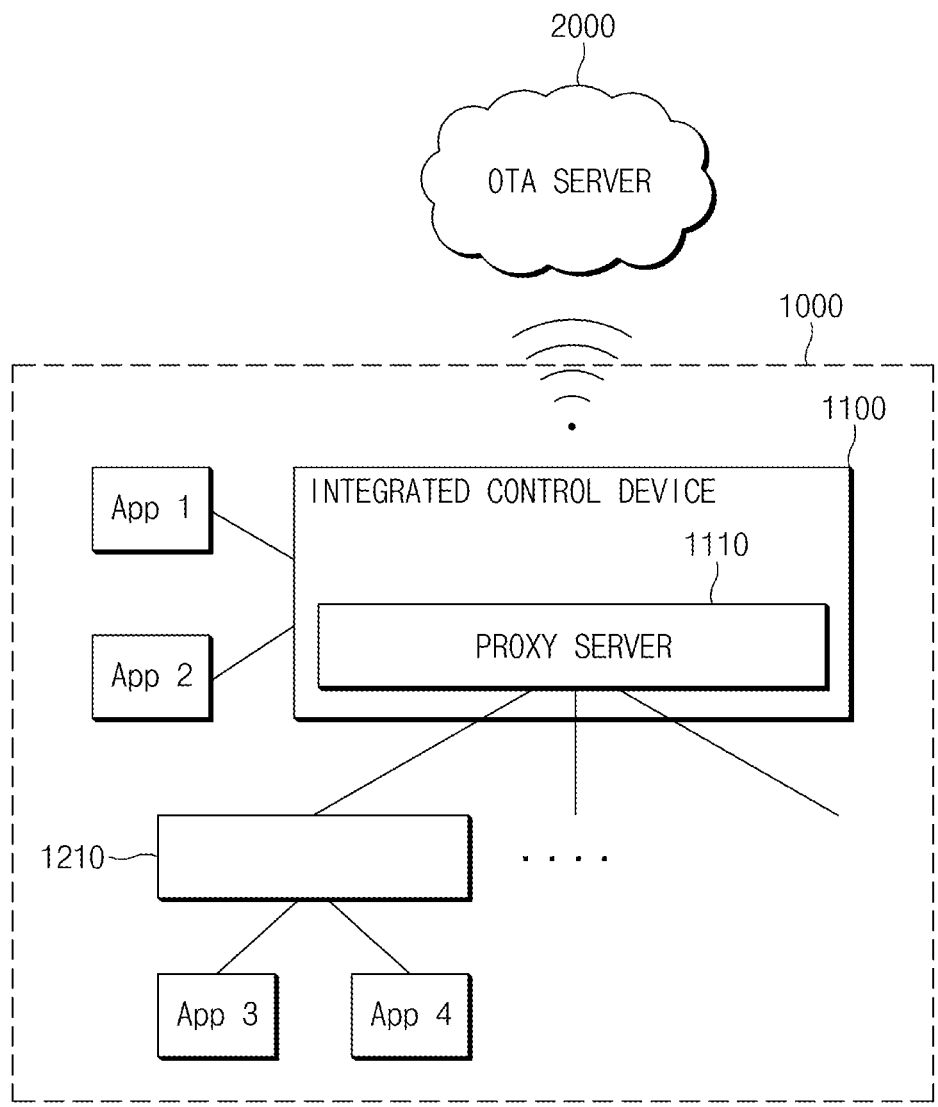
FIG. 7 is a conceptual diagram showing a vehicle and an OTA server according to an exemplary embodiment disclosed in the present disclosure.

FIG. 7 is a conceptual diagram showing a vehicle and an OTA server according to an exemplary embodiment disclosed in the present disclosure.

Referring to FIG. 7, the vehicle 1000 may include the integrated control device 1100, a proxy server 1110 included in the integrated control device 1100, a first application App1 of the integrated control device 1100, a second application App2 of the integrated control device 1100, the first control device 1210, a third application App3 of the first control device 1210, and a fourth application App4 of the first control device 1210.

The vehicle 1000, the integrated control device 1100, and the first control device 1210 may be substantially the same as the vehicle 1000, the integrated control device 1100, and the first control device 1210 in FIG. 1 described above, respectively.

The proxy server 1110 may receive information from the first application App1 and the second application App2 of the integrated control device 1100. For example, because the first application App1 and the second application App2 are applications installed on the integrated control device 1100, the first application App1 and the second application App2 may exchange the information with the proxy server 1110.

The proxy server 1110 may establish communication between the integrated control device 1100 and the third application App3 and the fourth application App4 of the first control device 1210. For example, the proxy server 1110 may receive the TCP/IP communication request from a socket end of the third application App3 and the fourth application App4, and establish the TCP/IP communication in response to the communication request.

The proxy server 1110 may establish the communication between the OTA server 2000 and the integrated control device 1100. For example, the proxy server 1110 may select the network provider based on the region in which the vehicle 1000 is located, set the communication policy, and establish the wireless communication with the OTA server 2000 based on the selected network provider and the set communication policy. Specifically, the wireless communication may include the TCP/IP communication.

When the communication between the integrated control device 1100 and the third application App3 and the fourth application App4 is established, and the communication between the integrated control device 1100 and the OTA server 2000 is established, the proxy server 1110 may relay communication between the third application App3 and the fourth application App4 and the OTA server 2000. That is, the proxy server 1110 may serve as a relay, and the third application App3 and the fourth application App4 may exchange the information on the software update directly with the OTA server 2000.

The proxy server 1110 may perform the access control function, the bandwidth throttling function, and the flow control function when relaying the communication between the third application App3 and the fourth application App4 and the OTA server 2000. For example, the proxy server 1110 may block the access to the vehicle 1000 from the outside, may limit the bandwidth of the wireless communication when the usage amount of the wireless data is higher than or equal to the threshold value, and may limit the flow of the wireless communication when the speed of the wireless data is higher than or equal to the reference value.

In one example, the proxy server 1110 may be substantially the same as the controller 120 in FIG. 2 described above.

In this connection, although only the first control device 1210, the third application App3, and the fourth application App4 are shown in FIG. 7, the present disclosure is not limited thereto. That is, a plurality of control devices may exist, and a plurality of applications of the plurality of control devices may exist. The proxy server 1110 may establish communication between the integrated control device 1100 and the plurality of applications, and thus relay the communication between the plurality of applications and the OTA server 2000 through a single communication establishment with the OTA server 2000. As a result, the proxy server 1110 may unify and manage OTA update of the plurality of applications.

In one example, the plurality of control devices may be control devices for performing the autonomous driving functions of the vehicle 1000, and the plurality of applications may be applications of the control device for performing the autonomous driving function of the vehicle 1000.

Hereinafter, a method for updating the third application App3 in the vehicle 1000 will be described in detail with reference to FIG. 8.

Figure 8:
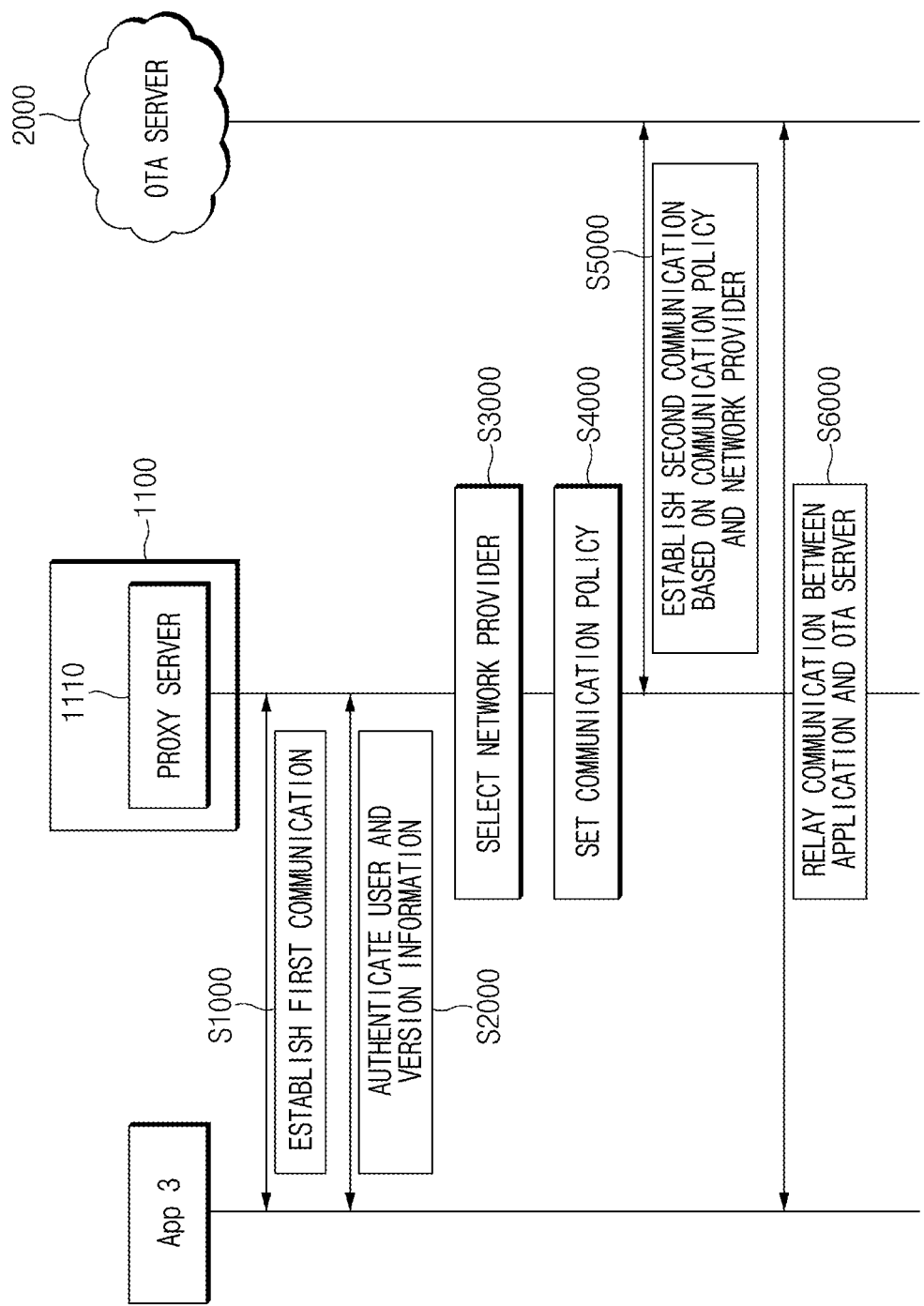
FIG. 8 is a view exemplarily showing an update operation of a vehicle according to an exemplary embodiment disclosed in the present disclosure.

FIG. 8 is a diagram showing an example of an update method at a vehicle level according to an exemplary embodiment disclosed in the present disclosure.

Referring to FIG. 8, the method for updating the third application App3 may include establishing first communication (S1000), authenticating the user and version information (S2000), selecting the network provider (S3000), setting the communication policy (S4000), establishing second communication based on the communication policy and the network provider (S5000), and relaying the communication between the application and the OTA server (S6000).

In the establishing of the first communication (S1000), the proxy server 1110 may establish the first communication between the third application App3 and the integrated control device 1100.

In the authenticating of the user and version information (S2000), the proxy server 1110 may receive a user and version information authentication request from the third application App3, and authenticate the user and version information.

In the selecting of the network provider (S3000), the proxy server 1110 may select the network provider based on location information of the vehicle 1000. For example, the proxy server 1110 may select the network provider based on the country in which the vehicle 1000 is located.

In the setting of the communication policy (S4000), the proxy server 1110 may set the communication policy for establishing the second communication based on the location information of the vehicle 1000.

In the establishing of the second communication based on the communication policy and the network provider (S5000), the proxy server 1110 may establish the communication between the integrated control device 1100 and the OTA server 2000 based on the set communication policy and the selected network provider.

In the relaying of the communication between the application and the OTA server (S6000), the proxy server 1110 may relay the communication between the third application App3 and the OTA server 2000. That is, in S6000, the third application App3 may directly download the information on the software update from the OTA server 2000. In this connection, the information on the update is not stored in and transmitted from the proxy server 1110. The OTA server 2000 may directly transmit the information on the update to the third application App3.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The update management device of the vehicle according to an embodiment disclosed in the present disclosure may manage the OTA update of the control devices in the integrated manner.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for managing update of a vehicle, the device comprising:
   a communication device in communication with at least one processor of the vehicle and in communication with an OTA (Over The Air) server for software update of the at least one processor; and
   a proxy server configured to:
   relay communication between the at least one processor and the OTA server;
   perform relay such that at least one application of the at least one processor directly receives information on the software update from the OTA server without storing the information in the proxy server when relaying the communication between the at least one processor and the OTA server; and
   control the at least one processor.

2. The device of claim 1, wherein the proxy server is further configured to:
   receive a communication request from at least one application of the at least one processor; and
   establish communication with the at least one application in response to the communication request.

3. The device of claim 1, wherein the proxy server is further configured to select a network provider for establishing the communication with the OTA server based on a region where the vehicle is located.

4. The device of claim 3, wherein the proxy server is further configured to:
   set a communication policy based on the region where the vehicle is located; and
   establish the communication with the OTA server through the network provider based on the communication policy.

5. The device of claim 1, wherein the proxy server is further configured to:
   obtain user information and version information from at least one application of the at least one processor and authenticate the user information and the version information; and
   transmit the authenticated user information and the authenticated version information to the OTA server.

6. The device of claim 1, wherein the proxy server is further configured to block access to the vehicle from outside when relaying the communication between the at least one processor and the OTA server.

7. The device of claim 1, wherein the proxy server is further configured to identify a usage amount of wireless data or a speed of the wireless data, and to perform bandwidth throttling and flow control based on the usage amount of the wireless data or the speed of the wireless data when relaying the communication between the at least one processor and the OTA server.

8. A method for operating a device for managing update of a vehicle, the method comprising:
   establishing communication with at least one processor of the vehicle;
   establishing communication with an OTA server for software update of the at least one processor; and
   relaying communication between the at least one processor and the OTA server,
   wherein the relaying communication between the at least one processor and the OTA server includes
   performing relay such that at least one application of the at least one processor directly receives information on the software update from the OTA server without storing the information in a proxy server.

9. The method of claim 8, wherein the establishing communication with at least one processor of the vehicle includes:
   receiving a communication request from at least one application of the at least one processor; and establishing communication with the at least one application in response to the communication request.

10. The method of claim 8, wherein the establishing communication with an OTA server for software update of the at least one processor includes
selecting a network provider for establishing the communication with the OTA server based on a region where the vehicle is located.

11. The method of claim 10, wherein the establishing communication with an OTA server for software update of the at least one processor includes:
setting a communication policy based on the region where the vehicle is located; and
establishing the communication with the OTA server through the network provider based on the communication policy.

12. The method of claim 8, further comprising:
obtaining user information and version information from at least one application of the at least one processor;
authenticating the user information and the version information; and
transmitting the authenticated user information and the authenticated version information to the OTA server.

13. The method of claim 8, wherein the relaying communication between the at least one processor and the OTA server includes
blocking access to the vehicle from outside when relaying the communication between the at least one processor and the OTA server.

14. The method of claim 8, wherein the relaying communication between the at least one processor and the OTA server includes
identifying a usage amount of wireless data or a speed of the wireless data, and performing bandwidth throttling and flow control based on the usage amount of the wireless data or the speed of the wireless data when relaying the communication between the at least one processor and the OTA server.

15. A vehicle comprising:
at least one processor of the vehicle; and
an integrated processor configured to:
communicate with the at least one processor of the vehicle;
communicate with an OTA server for software update of the at least one processor;
relay communication between the at least one processor and the OTA server;
perform relay such that at least one application of the at least one processor directly receives information on the software update from the OTA server without storing the information in a proxy server when relaying the communication between the at least one processor and the OTA server; and
control the at least one processor.

16. The vehicle of claim 15, wherein the integrated processor is further configured to:
authenticate user information and version information obtained from the at least one processor; and
transmit the authenticated user information and the authenticated version information to the OTA server.

17. The vehicle of claim 16, wherein the at least one processor includes at least one processor for performing an autonomous driving function of the vehicle, and
wherein the integrated processor is further configured to manage the autonomous driving function of the at least one processor for performing the autonomous driving function of the vehicle in an integrated manner.

* * * * *